Patented June 8, 1943

2,321,022

UNITED STATES PATENT OFFICE 2,321,022

CHEMICAL COMPOUND AND PROCESS

Arthur Lawrence Fox, Woodstown, N. J., assignor to E. I. du Pont de Nemours & Company, Wilmington, Del., a corporation of Delaware No Drawing. Application October 10, 1940, Serial No. 360,602

3 Claims. (Cl. 260—505)

This invention relates to new chemical compounds and processes and more particularly to alkyl substituted aromatic compounds which contain an exo-sulfonyl chloride group or an exo-sulfonate group.

This invention has an object the preparation of new surface active compounds and intermediates therefor. A further object is to prepare these new compounds by novel and easily conducted processes which give good yields of relatively high quality products. A still further object is to employ these new compounds in various technical applications. Other objects will appear hereinafter.

These objects are accomplished by the following invention in accordance with which new alkyl substituted aromatic compounds which contain an exo-sulfonyl chloride group or an exo-sulfonate group are produced. In these new compounds there is present an alkyl group which contains at least 5 or more carbon atoms. The preferred compounds of this invention are those in which an alkyl group contains 10 or more carbon atoms or at least two alkyl groups each contain 5 or more carbon atoms. These preferred compounds exhibit much greater surface activity than compounds which contain a total of less than 10 carbon atoms in the alkyl substituent or substituents. The aromatic portion of these compounds is preferably an aromatic hydrocarbon nucleus and more especially an aromatic hydrocarbon nucleus of the benzene and naphthalene series. The exo-sulfonate group in these new compounds has the general formula —$SO_3M$, in which M stands for a cation such as hydrogen or sodium.

The new compounds of this invention are preferably made by treating alkyl substituted aromatic compounds containing at least 5 carbon atoms in an alkyl chain with a mixture of sulfur dioxide and chlorine in the presence of light. It has been generally thought that the action of sulfur dioxide and chlorine in the presence of aromatic compounds does not proceed with any degree of completeness, and that the aromatic compound inhibits this reaction. I have found, however, that if the aromatic nucleus contains a side chain of sufficient length; e. g., at least 5 carbon atoms, the action of sulfur dioxide and chlorine will produce a mixture of compounds containing sulfonyl chlorine groups in the side chain. The yields depend somewhat on the length of the side chain, the longer the alkyl chain the greater being the yields under normal circumstances.

The new compounds of this invention may also be prepared by reacting alkyl substituted aromatic compounds with sulfuryl chloride in the presence of light and a catalyst such as pyridine.

Products of this type or those derived therefrom are useful in many of the arts, for example, for producing textile assistants, such as wetting agents, detergents, softening agents, waterproofing agents and the like, and they are also of interest for the production of dyestuff intermediates, such as are obtained by nitration of the aromatic nucleus followed by reduction of the nitro group. These processes offer the first known methods of obtaining in good yields exo-sulfonated alkyl aromatic hydrocarbons.

The term "exo" as used in this application is employed in the sense that it is used in the second edition of Webster's New International Dictionary to denote a group which is in the side chain and not in the ring of an alkyl aromatic compound.

The following examples illustrate but do not limit this invention. All parts are given by weight.

*Example I.—Secondary hexyl benzene exo-sulfonyl chloride*

200 parts of secondary hexyl benzene was treated in the presence of light from a tungsten filament lamp with sulfur dioxide and chlorine. The reaction was continued for seven hours during which time 970 parts of sulfur dioxide and 266 parts of chlorine were passed into the reaction mass. The product contained 9.9% chlorine and .97% sulfur.

*Example II.—Tri-iso-amyl benzene exo-sodium sulfonate*

75 parts of tri-iso-amyl benzene was treated with sulfur dioxide and chlorine for seven hours in the presence of light from a tungsten filament lamp. 1440 parts of sulfur dioxide and 092 parts of chlorine were passed into the reaction mass. The net gain in weight after blowing with nitrogen was 40 parts. The entire charge was hydrolyzed with 10 normal sodium hydroxide. The aqueous hydrolysate was diluted with water and was extracted with benzene to remove the unsulfonated oil. The aqueous material was then concentrated to 272 parts and contained 3.3% tri-iso-amyl benzene exo-sodium sulfonate. The unsulfonated oil contained 21.62% chlorine.

*Example III.—Didecyl benzene exo-sodium sulfonate*

50 parts of didecyl benzene was treated with sulfur dioxide and chlorine in the presence of light from a tungsten filament lamp for 4 hours using 385 parts of sulfur dioxide and 103 parts of chlorine. The net gain in weight after blowing with nitrogen was 17 parts. This didecyl benzene exo-sulfonyl chloride was hydrolyzed with 10 normal sodium hydroxide, and the aqueous hydrolysate was diluted with 200 parts of ethyl alcohol and 400 parts of water. This caused separation of 7 parts of unsulfonated oil containing 11.17% chlorine. The aqueous alcohol layer from which the unsulfonated oil was separated was then concentrated to 377 parts containing 11.9% active ingredient. The product was a good detergent in both soft and hard water.

*Example IV.—Didodecyl benzene exo-sodium sulfonate*

42 parts of didodecyl benzene was treated with 249 parts of sulfur dioxide and 95 parts of chlorine in the presence of light from a tungsten filament lamp. There was a gain in weight equivalent to 15 parts. The product, didodecyl benzene exo-sulfonyl chloride, was hydrolyzed with 10 normal sodium hydroxide and then diluted with 500 parts of water and 200 parts of alcohol. The aqueous layer was drawn off and concentrated to 60 parts. This contained an active ingredient content of 5.5%. The product was very satisfactory as a detergent.

*Example V.—Decyl xylene exo-sodium sulfonate*

43 parts of decyl xylene was treated in the presence of light from a tungsten filament lamp with sulfur dioxide and chlorine until there was a gain in weight of 19 parts after blowing with nitrogen. The decyl xylene exo-sulfonyl chloride thus produced was hydrolyzed with 10 normal sodium hydroxide and was then diluted with 700 parts of water and 200 parts of ethyl alcohol. The unsulfonated oil thus thrown out was separated and the aqueous solution concentrated to 164 parts. This contained 6.8% decyl xylene exo-sodium sulfonate.

*Example VI.—Decyl benzene exo-sodium sulfonate*

44 parts of decyl benzene was treated in the presence of light from a tungsten filament lamp with sulfur dioxide and chlorine until there was a gain in weight of 50%. The product was blown with nitrogen to removed dissolved gases. There was used in this reaction 201 parts of sulfur dioxide and 50 parts of chlorine. The decyl benzene exo-sulfonyl chloride thus produced was hydrolyzed with 10 normal caustic, and the hydrolysate was diluted with water to 500 parts. The unsulfonated oil was removed, and the aqueous solution concentrated to 172 parts. This contained an active ingredient of 21.7%.

*Example VII.—Dodecyl benzene exo-sodium sulfonate*

50 parts of dodecyl benzene was treated in the presence of light from a tungsten filament lamp with a mixture of chlorine and sulfur dioxide until a gain in weight of 23 parts had occurred. This material was hydrolyzed with 10 normal sodium hydroxide, and the unsulfonated oil removed as in the previous examples. The dodecyl benzene exo-sodium sulfonate thus produced was a good surface active agent.

*Example VIII.—Tetra-amyl benzene exo-sodium sulfonate*

71 parts of tetra-amyl benzene was treated with sulfur dioxide and chlorine in the presence of light from a tungsten filament lamp until the gain in weight was equivalent to 25 parts. There were used 551 parts of sulfur dioxide and 111 parts of chlorine. On blowing the reaction mass with nitrogen, there was a loss equivalent to 4 parts. The tetra-amyl benzene exo-sulfonyl chloride thus produced was hydrolyzed with 10 normal sodium hydroxide, and the hydrolysate was dissolved in 1,000 parts of water containing 200 parts of ethyl alcohol. The product was concentrated to 485 parts. This contained 5.2% active ingredient. It was very active as a detergent.

*Example IX.—Mixture of mono- and di-tridecyl benzene exo-sodium sulfonates*

50 parts of a mixture of mono- and di-tridecyl benzenes were treated in the presence of light from a tungsten filament lamp with sulfur dioxide and chlorine until the net gain in weight after blowing with nitrogen was equivalent to 12 parts. There was used 477 parts of chlorine and 1295 parts of sulfur dioxide. The reaction mass consisted of a mixture of mono- and di-tridecyl benzene exo-sulfonyl chlorides which was hydrolyzed with 10 normal sodium hydroxide. The hydrolysate was diluted to 1,000 parts. The unsulfonated oil was separated and the aqueous portion concentrated to 236 parts. This contained 7.4% active ingredients.

*Example X.—Diamyl naphthalene exo-sodium sulfonate*

53.5 parts of diamyl naphthalene was treated with sulfur dioxide and chlorine at 50–70° C. in the presence of light from a tungsten filament lamp for 8 hours. There was used a total of 244 parts of chlorine and 765 parts of sulfur dioxide. There was a gain in weight of 25 parts, but on blowing with nitrogen, there was a loss of 6 parts. The crude product containing diamyl naphthalene exo-sulfonyl chloride and chlorinated diamyl naphthalene was hydrolyzed with strong sodium hydroxide solution. The insoluble oil comprising unreacted diamyl naphthalene and chlorinated diamyl naphthalene was separated, and the aqueous solution of diamyl naphthalene exo-sodium sulfonate was found to be strongly surface active.

In the processes described in Example I to X the treatment of the organic compound with sulfur dioxide and chlorine was accomplished by mixing sulfur dioxide and chlorine in the gaseous state and then passing the mixed gases thru a fine distributor into the hydrocarbon. It is also feasible to carry out this reaction while maintaining all three of the reactants—the hydrocarbon, sulfur dioxide, and chlorine—in the liquid phase. The ratio of the sulfur dioxide to chlorine may be varied over a wide range. An excess of either may be used but in order to inhibit chlorination as a concurrent reaction it is desirable to use an excess of sulfur dioxide.

Although the preparation of these compounds by the use of sulfur dioxide and chlorine is the preferred method, other methods may be used. For example, the side chain of an alkyl aryl molecule may be halogenated in any desired manner and the halogen replaced by a sulfonic acid group either directly by the use of sodium sulfite or indirectly by the replacement of the halogen by an iso-thiourea group followed by oxidation with chlorine as disclosed by Johnson and Sprague in Jour. Amer. Chem. Soc. 58, 1348 (1936). The same product may also be obtained by treatment of the alkyl aryl hydrocarbon with sulfuryl chloride and a catalyst as disclosed by Kharasch and Read in Jour. Amer. Chem Soc. 61, 3089 (1939). The following example illustrates how sulfuryl chloride may be used to prepare new compounds coming within the scope of my invention.

*Example XI.—Triamyl bene exo-sodium sulfonate*

144 parts of triamyl-benzene and 100 parts of benzene were mixed and warmed to 50–55° C. in the presence of an incandescent light. Then one part of pyridine was added and 75 parts of sulfuryl chloride was gradually introduced over a period of 50 minutes. After maintaining the temperature another 1.5 hours at 50–55° C., one part of pyridine was added and the reaction mass maintained at 50–55° C. for 16 hours. Then another part of pyridine was added and the reaction continued 6 hours more.

The benzene and unreacted sulfuryl chloride were removed at 70–80° C. under vacuum, and 175 parts of a red brown oil was obtained. On hydrolysis with sodium hydroxide this gave triamyl-benzene exo-sodium sulfonate which showed excellent soft water detergency, moderate hard water detergency, and gave a wetting speed of 25 seconds at a concentration of 1 gram active ingredient per liter when tested by the method of Draves and Clarkson which is described in American Dyestuffs Reporter 20, 201 (1931).

The temperature at which the reaction is run may vary widely. The reaction may be carried out at temperatures so low that all reactants are liquid or it may be run at temperatures just below those at which the products of the reaction begin to decompose.

Instead of using sodium hydroxide to hydrolyze the sulfonyl chlorides I may employ aqueous solutions of potassium hydroxide, sodium carbonate, potassium acetate, ammonium hydroxide, quaternary ammonium hydroxides, methyl amine, dimethyl amine, trimethyl amine, ethanol amine, diethanol amine, triethanol amine, diethanol aniline, pyridine, piperidine, or other similar alkaline reacting compounds.

In the examples the use of light from a tungsten filament lamp has been specified. This is merely because it offers a convenient source of light and not because it produces a predominant quantity of the effective wave length. Other sources of light such as mercury arc, carbon arc, neon lights, fluorescent lights, direct or diffused sunlight or any other source providing wave lengths promoting this reaction may be used. Some of these light sources are superior to tungsten filament lamps.

Other aromatic nuclei than benzene are also contemplated. Thus alkyl naphthalenes, alkyl anthracenes, alkyl phenanthrenes, alky carbazoles, etc. may be converted to exo-sulfonates in this manner. Furthermore, the aromatic nucleus may contain substituents which themselves do not react with sulfur dioxide and chlorine, and hence compounds such as alkyl chlorobenzenes, alkyl benzoic acids, alkyl anthraquinones and alkyl nitro naphthalenes may also be used.

The above description and examples are intended to be illustrative only and not to limit the scope of the invention. Any departure therefrom which conforms to the spirit of the invention is intended to be included within the scope of the appended claims.

1. A process of making an alkyl substituted aromatic compound which contains an exo-sulfonyl chloride group which comprises reacting an alkyl substituted aromatic compound wherein an alkyl group contains at least 5 carbon atoms with sulfur dioxide and chlorine in the presence of light.

2. A process as defined in claim 1 according to which the exo-sulfonyl chloride group is converted by hydrolysis to an exo-sulfonate group.

3. A process of making an alkyl substituted aromatic hydrocarbon of the benzene and naphthalene series which contains an exocyclic sulfonyl chloride group which comprises reacting an alkyl substituted aromatic hydrocarbon of the benzene and naththalene series wherein an alkyl group contains at least 5 carbon atoms with sulfur dioxide and chlorine in the presence of light.

ARTHUR L. FOX.

---

CERTIFICATE OF CORRECTION.

Patent No. 2,321,022.                        June 8, 1943.

ARTHUR LAWRENCE FOX.

It is hereby certified that error appears in the printed specification of the above numbered patent requiring correction as follows: Page 1, first column, line 51, for the word "chlorine" read --chloride--; and second column, line 37, for "092 parts" read --492 parts--; page 2, first column, line 51, after "ingredient" insert --content--; and second column, line 11, for "were" read --was--; line 24, for "ingredients" read --ingredient--; line 43, for "Exemple" read --Examples--; page 3, first column, line 1, for "bene" read --benzene--; and second column, line 10, for "alky" before "car-" read --alkyl--; and that the said Letters Patent should be read with this correction therein that the same may conform to the record of the case in the Patent Office.

Signed and sealed this 20th day of July, A. D. 1943.

(Seal)                                        Henry Van Arsdale,
                                               Acting Commissioner of Patents.

CERTIFICATE OF CORRECTION.

Patent No. 2,321,022. June 8, 1943.

ARTHUR LAWRENCE FOX.

It is hereby certified that error appears in the printed specification of the above numbered patent requiring correction as follows: Page 1, first column, line 51, for the word "chlorine" read --chloride--; and second column, line 37, for "092 parts" read --492 parts--; page 2, first column, line 51, after "ingredient" insert --content--; and second column, line 11, for "were" read --was--; line 24, for "ingredients" read --ingredient--; line 43, for "Example" read --Examples--; page 3, first column, line 1, for "bene" read --benzene--; and second column, line 10, for "alky" before "car-" read --alkyl--; and that the said Letters Patent should be read with this correction therein that the same may conform to the record of the case in the Patent Office.

Signed and sealed this 20th day of July, A. D. 1943.

(Seal)

Henry Van Arsdale,
Acting Commissioner of Patents.